Oct. 21, 1969  P. H. SECKEL  3,474,162
METHOD AND APPARATUS FOR BLOWING AND CUTTING TUBING
Filed May 8, 1967  2 Sheets-Sheet 1
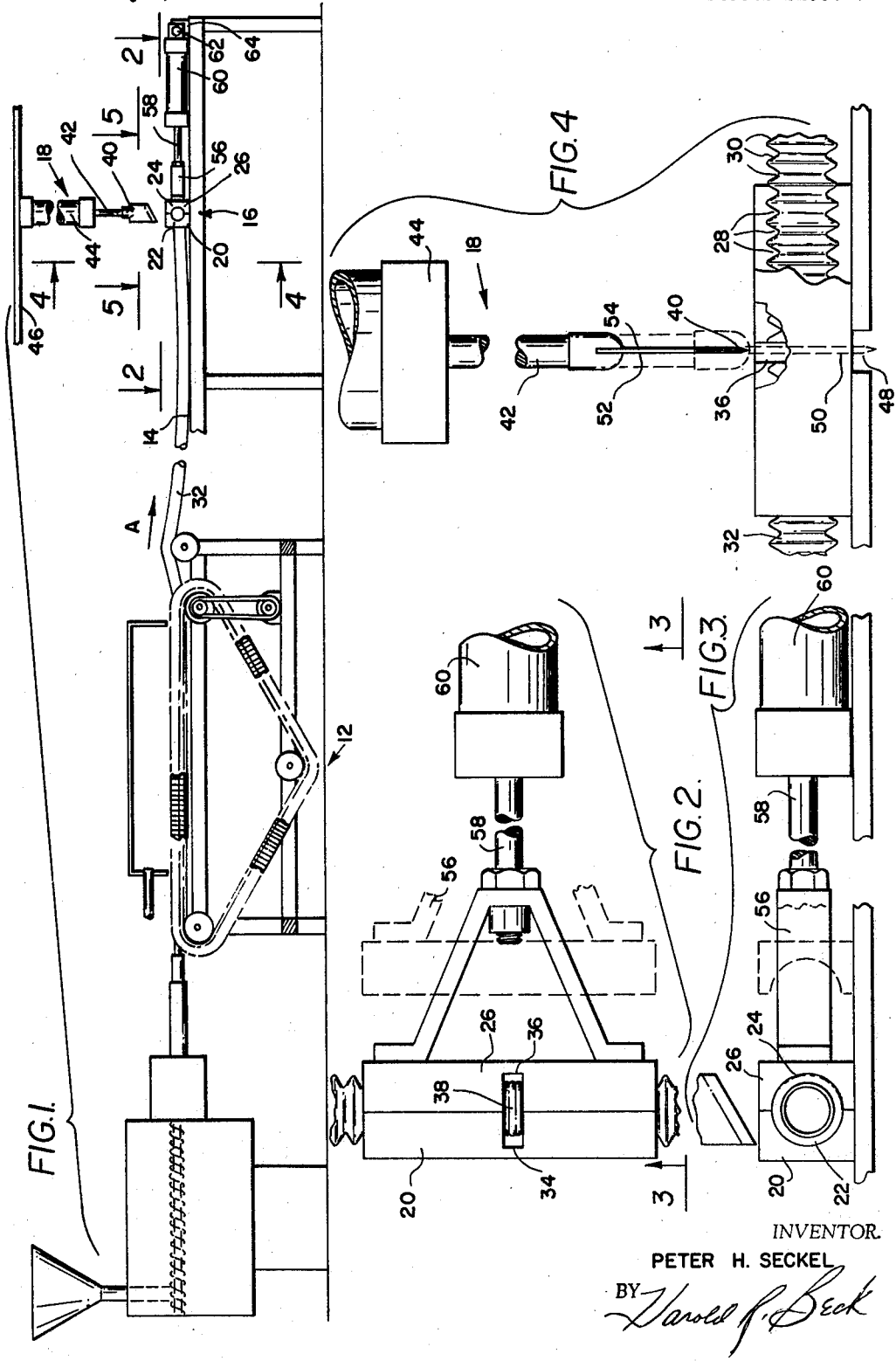
INVENTOR.
PETER H. SECKEL
BY Harold R. Beck Oct. 21, 1969  P. H. SECKEL  3,474,162

METHOD AND APPARATUS FOR BLOWING AND CUTTING TUBING

Filed May 8, 1967  2 Sheets-Sheet 2

INVENTOR.
PETER H. SECKEL
BY

United States Patent Office 3,474,162
Patented Oct. 21, 1969

3,474,162
**METHOD AND APPARATUS FOR BLOWING
AND CUTTING TUBING**
Peter H. Seckel, 14 Capron Lane,
Upper Montclair, N.J. 07043
Filed May 8, 1967, Ser. No. 636,929
Int. Cl. B29d 23/04, 23/18; B29c 17/14
U.S. Cl. 264—95                                6 Claims

ABSTRACT OF THE DISCLOSURE

A tube blowing and cutoff machine comprising a machine adapted to extrude plastic tubing while maintaining pneumatic pressure inside the tubing and forming the exterior of the tubing progressively by continuously movable dies, and concurrently cutting off sections of the tubing by a pair of spaced alternately operable knives which may be slicingly projected through the tubing, and held to form a seal, at the cut off ends of the tubing, to maintain blowing pressure inside the tubing, while the cut off sections are alternately held and removed during each alternate cycle of the pair of cutoff knives.

---

This invention relates to a tube blowing and cutoff machine, and more particularly, to a tube blowing and cut-off machine for continuously producing hollow tubing and progressively cutting off lengths of the tubing, while maintaining forming pressure therein.

BACKGROUND OF THE INVENTION

In the continuous production of hollow tubular articles, such as plastic tubing or hose, an extruder and continuously operable dies are utilized, together with means for applying fluid pressure to the interior of the extruded tubing.

An example of the prior art is my issued Patent 3,162,705.

In accordance with said patent, it is necessary to maintain forming pressure internally of a hollow, tubular element being extruded, and externally die formed, and consequently continuous production of such tubing has posed a problem in that commercial use of the tubing or hose may be in the form of vacuum cleaner hoses, swimming pool vacuum cleaner hoses, or other similar articles of definite lengths.

Rather than produce great lengths of such tubing or hose, and store it on a reel, or in other long lengths, it has been found desirable, during continuous production of such tubing, to cut the tubing into desired lengths for use as household vacuum cleaner hose, swimming pool vacuum cleaner hose, or for other uses.

Normally the starting end of the hose, when produced by a machine, in accordance with the invention, must be plugged or sealed in order to maintain internal fluid pressure necessary for the continuous blow forming of the tubing into a bellow-like hose configuration, or any other desired configuration.

Such maintenance of fluid pressure internally of the tubing, and the desire to continuously cut certain lengths of hose therefrom, posed a problem in that cutting of the tubing could result in loss of the fluid pressure internally thereof, which pressure is normally required to blow the tubing outwardly into forming contact with dies of the respective production machine.

SUMMARY OF THE INVENTION

Accordingly, it is an object of the present invention to provide a novel tube blowing and cutoff machine capable of continuously forming hollow tubular articles, such as hose and continuously cutting off desired lengths of the hose or tubing without the loss of fluid pressure internally of such tubing while being formed by the machine.

Another object of the invention is to provide a novel tube blowing and cutoff machine comprising a plastic tube extruder having means for introducing fluid under pressure internally of a tube extruded thereby, and dies for concurrently forming exterior portions of the tube in opposition to fluid pressure internally thereof, and wherein a pair of spaced alternately operable cutoff knives are disposed to cut off sections of said tube, while the tube is held by clamp fixtures of the invention in such a manner that the knives form seals at the cut off ends of the tube to thereby maintain blowing fluid pressure internally of the tube, while cutting off desired lengths thereof progressively, as the tube is continuously produced.

Another object of the invention is to provide a pair of novel power actuated hose cutoff fixtures alternately operable to cut off and seal hollow tubing during the continuous production of such tubing, whereby fluid pressure may be maintained in the tubing at all times during the progressive cutting of lengths therefrom.

BRIEF DESCRIPTION OF THE DRAWINGS

FIG. 1 is a fragmentary side elevational view of a tube blowing and cutoff machine, in accordance with the present invention, and showing a tube being produced by the machine;

FIG. 2 is an enlarged fragmentary plan view taken from the line 2—2 of FIG. 1, showing a tube clamp fixture of the invention holding a section of a tube therein;

FIG. 3 is a side elevational view of a structure, shown in FIG. 2, taken from the line 3—3 of FIG. 2;

FIG. 4 is an enlarged fragmentary sectional view taken from the line 4—4 of FIG. 1, showing portions of the structure further broken away and in section, and illustrating fragmentarily a portion of a tube held in a tube clamping fixture of the invention;

DESCRIPTION OF THE PREFERRED EMBODIMENTS

Figure 5:
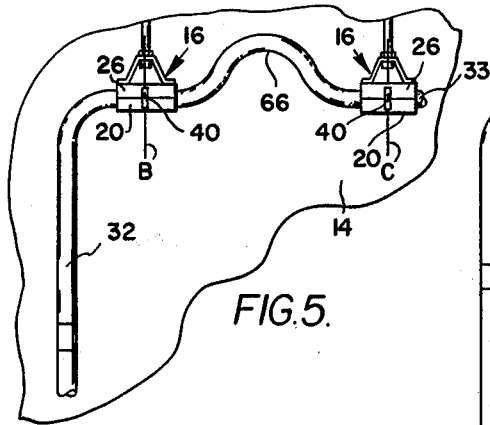
FIG. 5 is a plan sectional view taken from the line 5—5 of FIG. 1, showing fragmentarily a pair of tube cutoff knives and tube holding fixtures of the invention.

As shown in FIG. 1, the present invention includes a machine 12, which is similar to the machine disclosed in my issued Patent 3,286,305. This machine extrudes hollow plastic tubing, and supplies fluid pressure into the interior of the tubing while forming the outside of the tubing by progressive and continuously movable dies.

The tubing produced by the machine, progresses in the direction of an arrow A and onto a table 14 which supports a pair of spaced apart hose holding fixtures 16, and a pair of respective hose cutting knife assemblies 18.

Each hose holding fixture or assembly 16 is provided with a stationary die member 20 mounted on the top of the table 14, this die member 20 is provided with a semi-circular recess 22 disposed in opposition to a similar recess 24 in a movable die 26, the recesses 22 and 24 forming a hose holding bore when the dies 20 and 26 are held together, as shown in FIGS. 2 and 3 of the drawings.

As shown in FIG. 4, the recess portions 22 and 24 of the dies are provided with bellows engaging portions 28 to conform with bellows-like peripheral portions 30 of the tubing or hose 32 which may be produced by a machine 12.

It will be understood that the dies 20 and 26, at their recess portions 22 and 24, may be provided with any suitable internal configuratiton for holding the hose 32, or any other tubular article, as desired. In some instances, tubular articles which may be produced by the machine 12, may be merely held compressively by the dies 20 and 26 in their recessed portions 22 and 24.

As shown in FIG. 2 of the drawings, the dies 20 and 26 are provided with respective notches portions 34 and 36 extending vertically therethrough, and coinciding with each other so as to expose a cutoff area 38 of the hose 32 held between the recess portions 22 and 24.

Disposed directly above the recessed portions 34 and 36 is a sharp knife blade 40, which forms a part of each cutter blade assembly 18. The blade 40 is carried by a plunger 42 of a fluid operated actuator cylinder 44 mounted in depending relation with an overhead frame 46.

The table 14 directly below the notched portions 34 and 36 in the dies 20 and 26, respectively, is provided with an opening 48 through which the respective knife 40 may pass, as indicated by broken lines 50 in FIG. 4 of the drawings.

It will be seen that when the dies 20 and 26 engage the hose 32, as shown in FIGS. 2, 3 and 4 of the drawings, that the knife 40 may be projected into the broken line position to cut the hose from the extruded tubing 32, and when the knife 40 is held downward in the position, as indicated by broken lines 50, the hose is cut apart, and yet the blade 40, maintained in this position, will seal the cut off ends of the tubing, such that fluid pressure internally of the tubing is maintained. The hose or tubing made of resilient material tends compressively to be held against opposite sides 52 and 54 of the blade 40 so as to maintain an efficient seal to prevent the escape of pressure fluid from the interior of the hose or tubing 32.

The die 26 is movable relative to the die 20, so as to move the recess 24 of the die 26 away from the recess 22 a sufficient distance to allow the hose 32 to be removed from the dies 20 and 26, as will be hereinafter described.

In order to move the die 26 away from the die 20, a bracket 56 is connected to the die 26, and actuated by a plunger 58 of a fluid operated actuator cylinder 60. This fluid operated cylinder 60, shown in FIG. 1 of the drawings, is pivotally mounted on the table 14 by means of a pin 62 which passes through a bracket 64 fixed to the table 14.

As shown in FIG. 5, the hose or tubing 32 is initially produced with a plugged end 33 which must be cut off. Accordingly, a pair of the knives 40, and respective tube holding assemblies 16, are located on the table 14 in certain spaced relation to permit the cutting of given or predetermined lengths of hose from the continuously produced hose 32, as will be hereinafter described.

Accordingly, for purposes of reference, the pair of knives 40, shown in FIGS. 5 to 9, inclusive, are disposed in locations B and C. It will be seen that the knives 40 at locations B and C are placed closer together than the desired lengths of hose to be cut from the continuous reproduced hose 32. In FIG. 5, a loop 66 of the hose 32 is shown positioned between the knives 40 at locations B and C so as to dispose certain portions of the hose in the dies 20 and 26, and in register with the slots 34 and 36, and the respective cutoff knives 40. Accordingly, reference is made to FIG. 10 of the drawings, showing the hose 32 which is provided with spaced cylindrical cutoff areas 64 having median portions 66 through which one of the knives may pass at either knife location B or C, as will be hereinafter described. The cylindrical portions 64 may be of a desirable configuration or diameter to fit fixtures of household vacuum cleaners or swimming pool vacuuming systems or any other equipment on which hose may be utilized.

It will be understood that the cylindrical portions 64 of the hose 32 may be spaced apart different distances, as desired, for producing the hose specifically to be cut off for certain uses.

The machine 12, with its plurality of dies, may be set up with dies for producing the cylindrical portions 64 at various spaced positions longitudinally along the hose 32.

Accordingly, attention is now drawn to the loop of hose 66 disposed in FIG. 5, and to sequential operation of the knives 40 at locations B and C.

The knife 40, at location C, is first actuated while the dies 20 and 26 hold the hose, as hereinbefore described. The knife 40, at location C, is maintained in a downward position, as indicated by broken lines 50, in FIG. 4, until the knife 40, at location B, has been also brought into the position, as indicated by broken lines 50 in FIG. 4. Thus, at all times, these knives seal the cutoff ends of the hose 32 to maintain fluid pressure internally of the hose sufficient for blow forming thereof.

Figure 6:
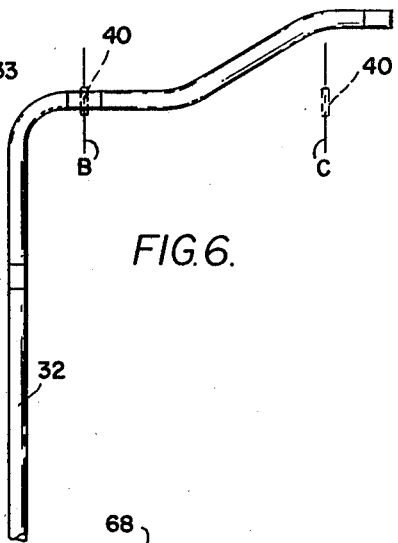
FIG. 6 is a diagrammatic plan view of a tube being produced by the machine of the invention, and showing progressive operation of the tube cutoff knives of the invention following the operation illustrated in FIG. 5.
Figure 7:
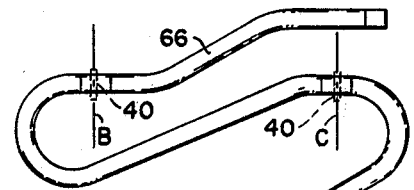
FIG. 7 is a diagrammatic plan view similar to FIG. 6, but showing a tube cutoff operation of tube cutting knife fixtures of the invention progressing from the operation, as shown in FIG. 6.

Progressing from the operation, shown in FIG. 5, to that diagrammatically disclosed in FIG. 6, it will be seen that after the knife 40, at locatiton B, has been projected from side to side through the hose 32, that the end of the hose 32 may be released from the dies 20 and 26, at location C, and that progression from the operation, shown in FIG. 6, to the operation, shown in FIG. 7, permits the loop section 66 of the hose to be cut off by the knife 40 at location B, after the knife 40, at location C, has been projected through the hose into the broken line position, as shown in FIG. 4, to dispose a second section 68 of the hose between the knives 40, at locations B and C, while the clamping assembly 16 holds the hose, as shown in FIGS. 2, 3, and 4 of the drawings.

Figure 8:
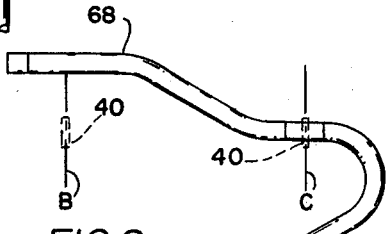
FIG. 8 is a diagrammatic plan view showing progressive cutoff operation of the knife and holding fixtures of the invention, following the operation, as shown in FIG. 7.
Figure 9:
FIG. 9 is a diagrammatic plan view, showing a progressive tube cutoff operation following that as shown in FIG. 8.
Figure 10:
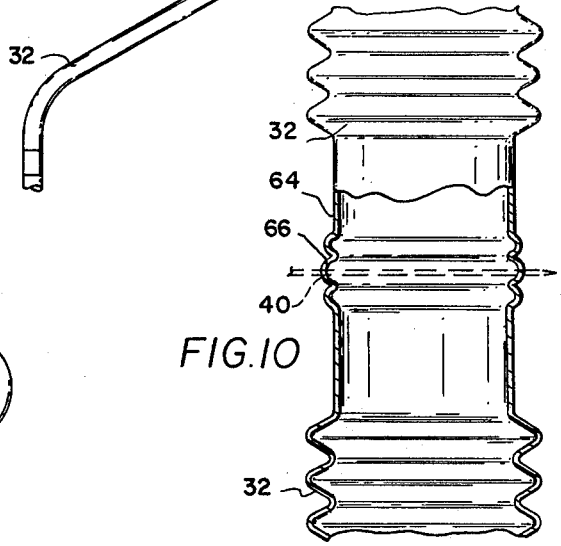
FIG. 10 is an enlarged fragmentary side elevational view of tubing or hose, such as may be produced by the machine of the invention, and illustrating by broken lines, a cutoff disposition of one of the hose cutoff knives of the invention.

After the knife 40 has been projected through the hose 32, and a section 68 is thus held between the hose holding assemblies 16, at locations B and C, the section 66 of hose may be released by opening the die 26 relative to the die 20, and by retracting the knife 40 upwardly to a solid line position, shown in FIG. 4. The section of hose designated 68, as shown in FIG. 8 of the drawings, may then be moved upwardly or laterally from the knife and hose holding assembly, at location B, to permit progression of the operation to that as shown in FIG. 9. As shown in FIG. 9, a subsequent section 70 of the hose may be disposed between the knives 40, at locations B and C, such that the knife 40, at location B in FIG. 9, when projected through the hose from side to side, seals off the hose while held in the dies as shown in FIG. 4 of the drawings, such that the knife, at location B in FIG. 9, is then in the broken line position 50, as illustrated in FIG. 4. At this time, the knife 40, at location C in FIG. 9, may be retracted upwardly and the dies 26 may be released from the die 20 to permit the hose section 68 to be removed and separated.

The knives 40, and the hose holding assemblies 16 may be alternately operated in the foregoing progressive sequential relationship to cut off predetermined lengths of the hose 32, while either one or the other of the knives 40, at locations B or C, maintain a sealed relationship with the cut off ends of the hose, as shown in FIG. 4, wherein the knife is projected into a position as indicated by broken lines 50, and one pair of the dies 20 and 26 hold the hose firmly in sealing contact with opposite sides of the knives to maintain fluid pressure internally of the hose, and sufficient to serve the blow forming operation of the machine 12, as hereinbefore described.

It will be obvious to those skilled in the art that various modifications of the present invention may be resorted to in a manner limited only by a just interpretation of the following claims.

I claim:

1. In a tube blowing and cutoff machine, the combination of: a machine having a plastic tube extruder adapted to extrude a continuous tube; means for introducing fluid under pressure into said tube; tube cutoff means adapted to cut said tube into desired lengths; said cutoff means comprising first and second knives spaced apart; and tube holder means adjacent each of said first and second knives, each tube holder means adapted to engage and hold said tube adjacent to each of said first and second knives, whereby either said first or second knives may be projected transversely from side to side through said tube to cut off said tube, and to seal the cutoff end of said tube against substantial leakage of said fluid from said tube in order to maintain sufficient pressure of fluid effectively to blow form said tube downstream from said extruder.

2. The invention, as defined in claim 1, wherein: said first and second knives, and said respective tube holder means are alternately operable relative to said tube progressively to cut off said desired lengths of said tube.

3. The invention, as defined in claim 1, wherein: said tube holding means is adapted to restrain said tube from movement away from one side of a respective one of said knives to thereby hold a cut off end of said tube in a substantially closed condition, such that effective blowing pressure of said fluid is maintained in said tube.

4. The invention, as defined in claim 1, wherein: each of said tube holding means is provided with a pair of separable members disposed to clamp on opposite sides of said tube, and an actuator for moving one of said members relative to the other of said pair of members.

5. The invention, as defined in claim 4, wherein: an actuator is provided for moving each of said knives relative to said tube holding means for cutting said tube.

6. A method for continuously blow forming and cutting plastic tubes into desired lengths consisting in: extruding a hollow plastic tube; subjecting the interior of said tube to pressure of fluid under pressure to form said tube; and progressively cutting off sections of said tube by slicingly passing a first knife blade through said tube from side to side, while covering the cut off end of said tube with said knife blade to thereby prevent fluid leakage from said tube and to thereby maintain fluid pressure sufficient to blow from said tube; and thus holding said first knife while slicingly passing a second knife blade from side to side through said tube in longitudinally spaced position along said tube from said first mentioned knife blade; and alternately cutting and closing cut off ends of said tube by repeating progressive and successive use of said first and second knife blades, as aforementioned.

References Cited

UNITED STATES PATENTS

| | | |
|---|---|---|
| 1,771,414 | 7/1930 | McKenzie _____ 264—150 |
| 2,607,074 | 8/1952 | Slaughter. |
| 2,422,953 | 6/1947 | Davies et al. |
| 2,948,919 | 8/1960 | Matthews. |

WILLIAM J. STEPHENSON, Primary Examiner

U.S. Cl. X.R.

18—2, 12, 14; 264—150